June 28, 1938.   J. HAM   2,121,774
AIR RELEASE MEANS AND COMBINATION IN RAILWAY AIR BRAKE SYSTEM
Filed Jan. 26, 1938   2 Sheets-Sheet 1
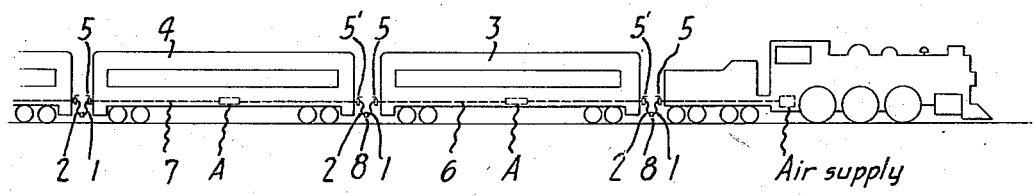
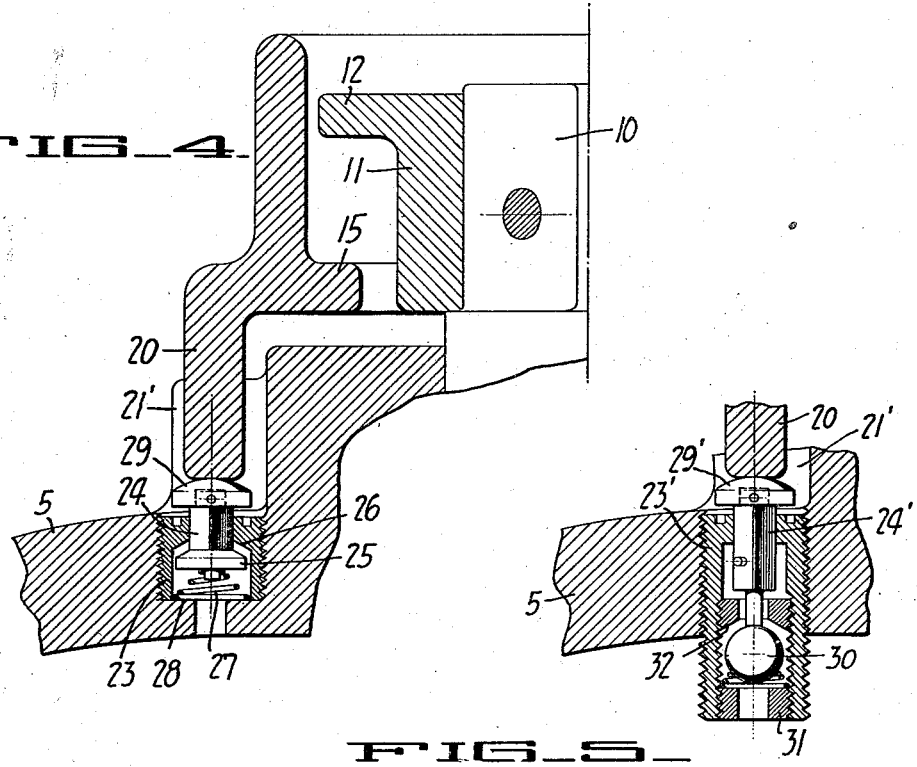
INVENTOR.
John Ham
BY Boyken & Mohler
ATTORNEYS.

June 28, 1938.  J. HAM  2,121,774
AIR RELEASE MEANS AND COMBINATION IN RAILWAY AIR BRAKE SYSTEM
Filed Jan. 26, 1938  2 Sheets-Sheet 2
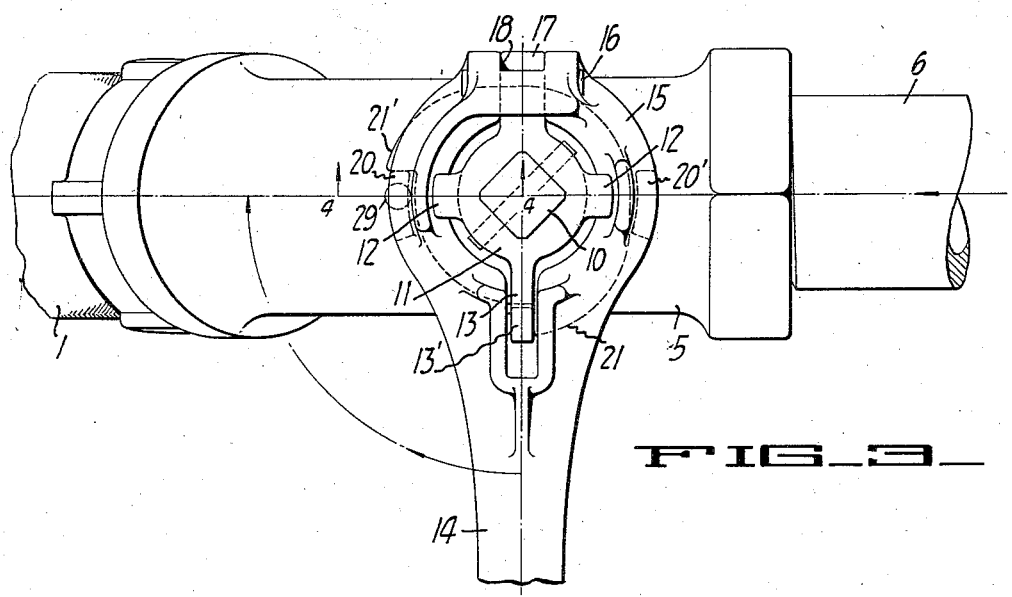
FIG_3_
FIG_2_
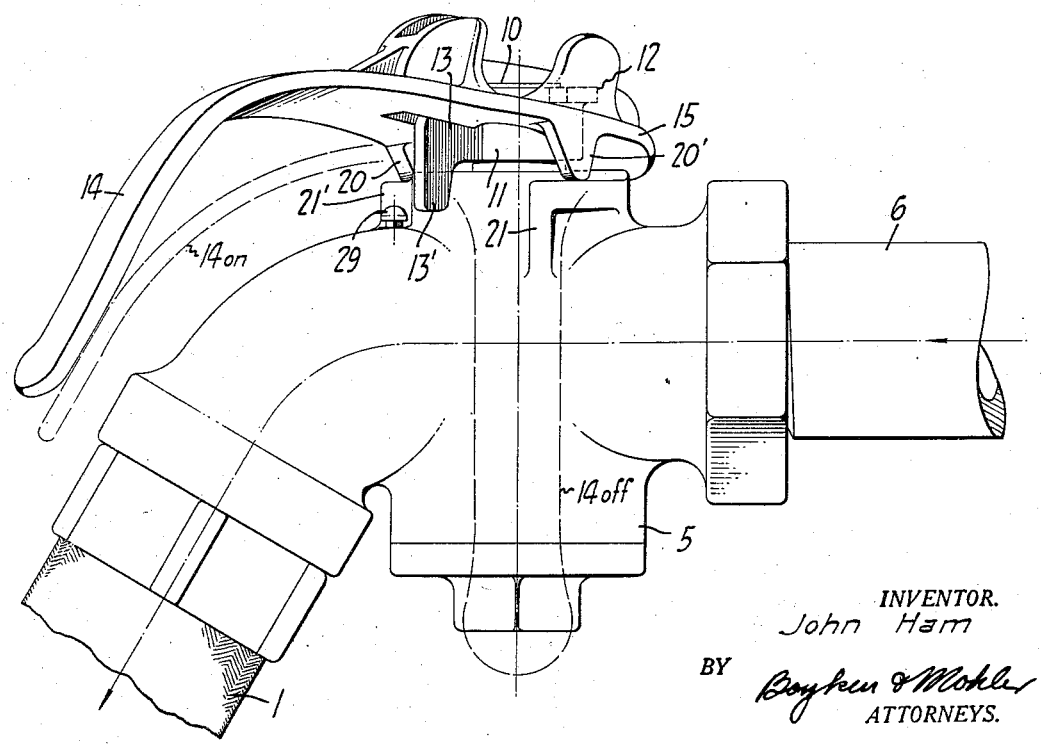
INVENTOR.
John Ham
BY
ATTORNEYS.

Patented June 28, 1938

2,121,774

UNITED STATES PATENT OFFICE 2,121,774

AIR RELEASE MEANS AND COMBINATION IN RAILWAY AIR-BRAKE SYSTEM

John Ham, San Francisco, Calif.

Application January 26, 1938, Serial No. 187,010

5 Claims. (Cl. 303—86)

This invention relates generally to air release means in a railway air-brake system and in combination with conventional elements in such system and has for its objects improved, simple dependable, economical and easily installed means in a system, as above described, for automatically releasing the compressed air in the coupled sections of air hose between cars in a train for facilitating the uncoupling of the sections without detrimental wear on the sections in the uncoupling of said sections upon closing the angle cocks at one or both ends of said coupled sections. A further object is to provide simple means in an air-brake system in trains for substantially eliminating the dangers attendant upon uncoupling the air hose sections between cars and which means also functions to set the air-brakes on the car or cars to be uncoupled upon closing the air line at said coupled air lines before uncoupling the cars. Other objects and advantages will appear in the description and drawings annexed hereto.

In the drawings, Fig. 1 is a diagrammatic view of a train of coupled cars showing the positions of the angle cocks and coupled sections of flexible air hose between said cars.

Fig. 2 is an elevational view of the angle cock at the end of the car nearest the locomotive, assuming the locomotive to be at the right relative to the cock, the conventional valve actuating lever handle being raised and positioned midway between the "on" and "off" position.

Fig. 3 is a plan view of a conventional angle cock showing in a dotted circle the position of my improved air release means.

Fig. 4 is an enlarged fragmentary sectional view through my air release means on the angle cock.

Fig. 5 is an enlarged fragmentary sectional view through a modified form of air release means.

Briefly described, heretofore in the conventional air-brake systems in railway cars, a through air pressure line connects between cars by flexible air hose sections coupled together between adjacent ends of pairs of the cars, each car carrying a rigid pipe line between the ends of which is the brake actuating means for setting the brakes upon a drop in air pressure in the line thereby creating a differential in air pressure in said actuating means to actuate the brakes. The flexible air hoses are at the opposite ends of said rigid pipe line and the connection between the flexible sections and the ends of the pipe comprise angle cocks or valves in which the valve is actuated by a handle for turning thereof to "on" and "off" position. In freight trains the through air line ordinarily must carry 90 lbs. pressure to the square inch and in passenger trains 110 lbs. pressure per square inch.

A leakage not exceeding 2 lbs. per minute is permissible in passenger trains in the entire length of the air line, and a leakage not exceeding 5 lbs. per minute is permissible in freight trains. In uncoupling the air hose sections between cars, the operator is supposed to first turn the angle cock nearest the locomotive or engine at the desired sections to "off" position and then to turn the angle cock adjacent thereto on the next succeeding car to "off" position. The coupling between the air hoses extending from adjacent angle cocks is then broken by hand, or by uncoupling the cars and pulling one hose away from the other. To uncouple the hoses by hand is practically impossible where the adjacent cars at opposite sides of the coupling are on a relatively sharp curve due to the fact that the coupled air hoses extend away from the coupling at a sharp angle relatively, with the coupling at the apex, and in any event a pressure of 90 lbs. or 110 lbs. of air pressure to the square inch is trapped in the coupled hose sections between the angle cocks. Furthermore, if the hose coupling is broken by first uncoupling the draw-bars and then separating the cars to forceably uncouple the sections, the hose sections are severely strained and the sudden release of the air pressure therein will cause the uncoupled sections to be violently swung backwards and forwards and to thereby endanger the operator engaged in uncoupling the cars.

With my invention, upon the operator turning the angle cock on the car nearest the engine to "off" position, there is immediately a release in the through air pressure line beyond said angle cock that results in a light setting of the brakes on the cars beyond the angle cock, which is desirable and is ordinarily required by law, and then by turning the angle cock on the other end of the coupled hose sections, a further exhaust is provided for the air in the coupled hose sections, and said hose sections are easily and quickly uncoupled by hand without injury to the hose sections and with safety to the operator. My invention does not contemplate in any way modifying the main valve of the angle cocks, since it is essential that this valve maintain its seal when turned to "off" position, and any porting of the valve casing that would decrease the maximum sealing seat between the valve and casing would not be desirable nor permissible.

In detail, in Fig. 1 is semi-diagrammatically illustrated the hose sections 1, 2 between the adjacent ends of adjacent cars 3 and 4. Car 3 is intended to be the one nearest the engine. Hose section 1 is connected by an angle cock 5 with pipe line 6 carried by car 3, and hose section 2 is connected by angle cock 5' with pipe line 7 carried by car 4. The conventional brake actuating means A is in the lines 6 and 7 on each car intermediate the ends of each line. The free adjacent ends of the sections are coupled by the conventional coupling 8, the conventional draw-bars connecting between the cars and the removable pins, etc., on the draw-bars to disconnect and to lock the same in coupled position not being shown. The angle cocks 5 and 5' in all standard installations are at opposite sides of the draw-bars, thus the hose sections extend transversely across and below the draw bars, which arrangement causes the relatively acute angle of the hose sections relatively where the cars are on a sharp curve.

In Fig. 2 is an enlarged elevational view of angle cock 5 with the conventional valve actuating arm lifted and turned half way between the "on" and "off" positions to clearly show my invention and the means for actuating the same.

The conventional angle cock carries thereon the usual movable taper valve plug that fits against a taper seat in the valve casing, which seat is a brass or bronze bushing. The valve plug is extended out of the upper side of the casing which extension is in the form of a square shaft 10 (Fig. 3) secured to which is a collar 11 having laterally projecting lugs 12 projecting from the upper edge of the collar at opposite sides thereof and a vertical rib 13 is formed on and projects outwardly from a side of the collar midway between said lugs 12.

A handle 14 for actuating the valve plug is enlarged at one end as at 15, which enlarged end is formed with a generally annular opening adapted to relatively loosely receive the collar 11 therein; which handle is pivotally connected with the collar by a pivot 16 that extends horizontally through a lug 17 formed on said collar and the sides of a slot 18 formed in enlargement 15 of the handle.

The inner side of the enlarged portion of the handle opposite the pivot is also vertically slotted to pass the rib 13. Thus the handle 14 may be swung up and down on pivot 16, but at all times the upward swing is limited by the lugs 12 on the collar 11 engaging enlargement 15 of the handle. The handle, being relatively heavy, will normally tend to swing downwardly to a position in which the enlarged end 15 thereof and collar 11 are in the same plane. The underside of enlarged end 15 of the handle is formed with a pair of downwardly projecting lugs 20, 20' (Fig. 2), which lugs are at opposite sides of the opening in said enlarged end and equally spaced from the handle 14.

When the handle 14 is in the position indicated in Fig. 3, or when the valve is in "off" position, a downward projection 13' of rib 13 will engage a projecting lug 21 formed on the valve casing 5 and at the same time lug 20 on the enlarged end 15 of the handle will be positioned substantially against a lug 21', which also projects from the valve casing 5 at a point a quarter of the distance around the casing and which latter lug is disposed with its surface engaging lug 20 about in a vertical plane extending longitudinally through the casing. The engagement between projection 13' and lug 21 prevents further movement of the valve handle to beyond the "off" position, and the engagement between lugs 20, 21' prevents movement of the handle in the opposite direction. However, upon swinging handle 14 upwardly, the lugs 20, 21' are disengaged and the handle may be turned to the left until projection 13' engages lug 21', and then when the handle is dropped, the lug 20' engages the lateral face lug 21 and the valve is again locked against turning in opposite directions.

I provide adjacent the lug 21' a valve means adapted to be actuated by the lug 20 of the handle when the latter is dropped to locking position after the valve handle 14 is turned to close the main valve. Referring to Fig. 4, this valve means comprises a threaded plug 23, threadedly engaging in an opening through the valve casing along side, but spaced from the main valve and its seat. Said plug is centrally apertured to pass a stem 24 connected at one end to disk or cone valve member 25, which latter is formed with tapered sides to seat against seat 26 within the plug, said member 25 and the stem being forced upwardly by expansion coil spring 27 which reacts between disk 25 and a shoulder 28 therebelow formed either in the bore in which the plug is seated or which may be formed in the lower end of the plug 23. The upper end of stem 24 carries a cap or button 29 adapted to be engaged by lug 20 when the handle is dropped. The projection 13' of rib 13 is, of course, sufficiently elevated to clear the cap 29 when the handle 14 is turned to open the main valve.

Upon dropping handle 14 when the main valve is turned to "off" position, the depression of valve 25 will effect a release of the air in the air hose adjacent thereto, and since the angle valve nearest the engine is closed first, the result of releasing said air will cause the brakes to lightly set in the cars rearwardly of said angle valve. When the adjacent angle cock at the other end of the coupled section is closed, and the handle released to drop in locked position, the air line beyond said latter angle cock is closed but a further release of air in the coupled hose section is effected, whereby the air pressure in said sections is reduced quickly to a point where the sections may readily be uncoupled by hand irrespective of the angular relation between the hose sections.

Fig. 5 merely shows a modified form of air release valve in which a ball 30 is substituted for the disk and in which the plug mounting the ball carries an apertured disk 31 threadedly engaged in the lower end of the plug for supplying the spring that reacts between said disk and ball to hold the ball seated against valve seat 32 when the cap 29' is depressed. The cap 29' carries stem 24' that engages the upper side of the ball to depress the latter for opening the valve. The aperture in plug body 23 of Fig. 4 or plug body 23' of Fig. 5 is circular and the stems 24, 24' both being square permit ready release of air therepast through the plug from within the valve casing mounting the main valve of the angle cock, but it is of course obvious that other means may be used. However, by the above means, there is little chance of dirt or impurities stopping up the air passage since the valve stem moves with each actuation of the small or auxiliary air release valve and since the valve seat in each type of valve faces downwardly, the dirt will not collect on said seat, and is free to fall over the valve disk or ball to drop into the main air line. The type of valve body mounting either the ball 30 or disk 25 may be formed with a nut at its upper end for unscrewing the body, or as indicated in Figs. 4 and 5, with recesses for a spanner wrench.

It will be seen from the foregoing description that my release valve may be quickly installed on a standard angle cock without in any manner interfering with the main valve and without reducing the efficiency of the seal of the main valve, and without restricting the flow of air through the main valve and its inlets and outlets. Also, my release valve is fully protected by the enlargement 15 of the handle 14 and by lug 21' against injury from the side or top of the angle cock, and cannot be stepped on by the operator or others. The release valve must be positively moved to open the same, and when closed will not leak since it has the air pressure in the line as well as the spring to hold it closed. Replacements may be quickly made if and when desired, with negligible cost and the saving in the flexible air hoses, due to elimination of the excessive flexing thereof when the coupled sections are broken without release of air pressure therein, is materially reduced. Also, of course, practically all dangers heretofore present where there has been no effective air release, are eliminated.

The air escape through my air release means is from 2 to 5 pounds per minute only when the same is wide open, which obviously will quickly lower the pressure in the limited area enclosed by the coupled hose sections when the angle cocks at opposite ends are closed, but in the event of any accidental opening of the air release means for any reason, or in the event of any foreign matter lodging in said means to prevent tight closure of the valve when the angle cock is open, the brakes will not be applied sufficiently to damage or injure the train or to throw the brakes into "emergency", since the engine pump will function to keep up the pressure in the pressure line. If the air release were not restricted, as above stated, but were to release a large volume of the air suddenly, a train travelling at say from 35 to 60 miles per hour at the time of such release would be seriously damaged if not wrecked. Hence the limited escape of air in the line under a pressure of say about 70 to 110 lbs. per square inch, as above described, is very important.

Having described my invention, I claim:

1. In an air-brake system in railways cars, a valve, continuing portions of an air pressure line extending from opposite sides of said valve, said valve being movable from an open position for flow of air therepast and through said portions to a closed position closing the flow of air therepast and through said portions, normally closed air release means carried by one of said portions of the air pressure line movable to open said portion to release of air therein, valve actuating means for moving said valve from open to closed position, and means movable with said valve actuating means arranged and adapted to actuate said air release means for releasing the air in said one of the portions of the air pressure line only after said valve is moved to closed position, said air release means being separate from said valve.

2. In a construction as defined in claim 1, said valve actuating means comprising a handle secured to said valve and the means for actuating said air release means being carried on said handle.

3. In combination, a pair of railway cars coupled together, an air brake system for the cars including a continuous air pressure line, comprising a substantially rigid pipe line on each car terminating at its ends at opposite ends of the car and releasably coupled sections of flexible air hose extending between adjacent ends of the pipe lines and between adjacent ends of the cars of the pair a pipe fitting carrying a valve therein secured on each of the adjacent ends of the pipe lines and connecting with the opposite ends respectively of the coupled sections, means on each valve for moving the valve from open position in which air is free to pass through the fitting between the pipe line and hose section connected thereby to closed position to close the fitting to passage of air therethrough, manually operable means for moving the valve to closed position, and air release means actuated by the manually operable means for opening the coupled hose sections to exhaust of air therefrom when the manually operable means is moved to closed position.

4. In the combination as defined in claim 3, said air release means being separate from the valve and comprising an auxiliary valve carried on the fitting between the valve and the end of the hose section connecting with said fitting.

5. In the combination as defined in claim 3, the means for moving said valve comprising a handle pivotally secured at one end thereof to said valve for swinging the handle in a vertical plane upon lifting the handle and for falling of the handle by gravity upon releasing the same after lifting thereof, and said air release means comprising an auxiliary valve mounted in said fitting having an actuating member projecting outwardly of the fitting and positioned to be engaged by the handle on the valve for actuation by the falling handle to open said auxiliary valve when the valve connected to the handle is moved thereby to closed position.

JOHN HAM.